June 16, 1925.

H. KLINE

WHEELED SCRAPER

Filed Feb. 20, 1924   2 Sheets-Sheet 1

1,542,308

INVENTOR
HARRY KLINE
by Frank Waterfield
ATTORNEY.

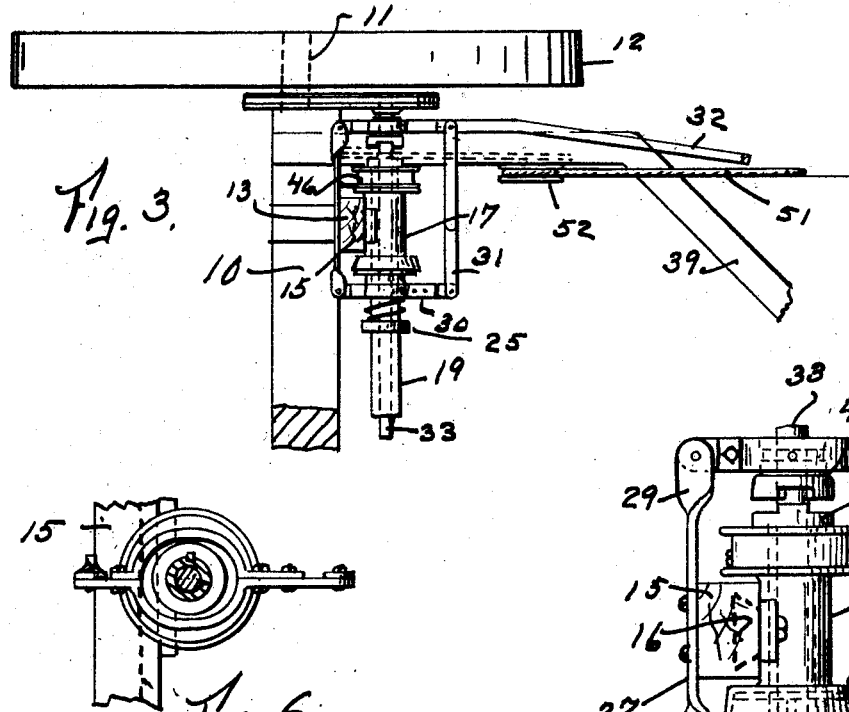
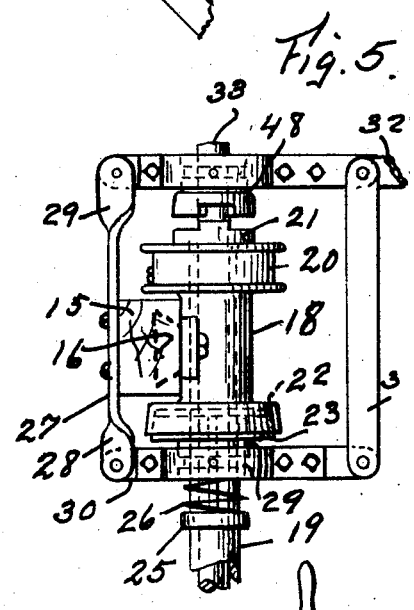
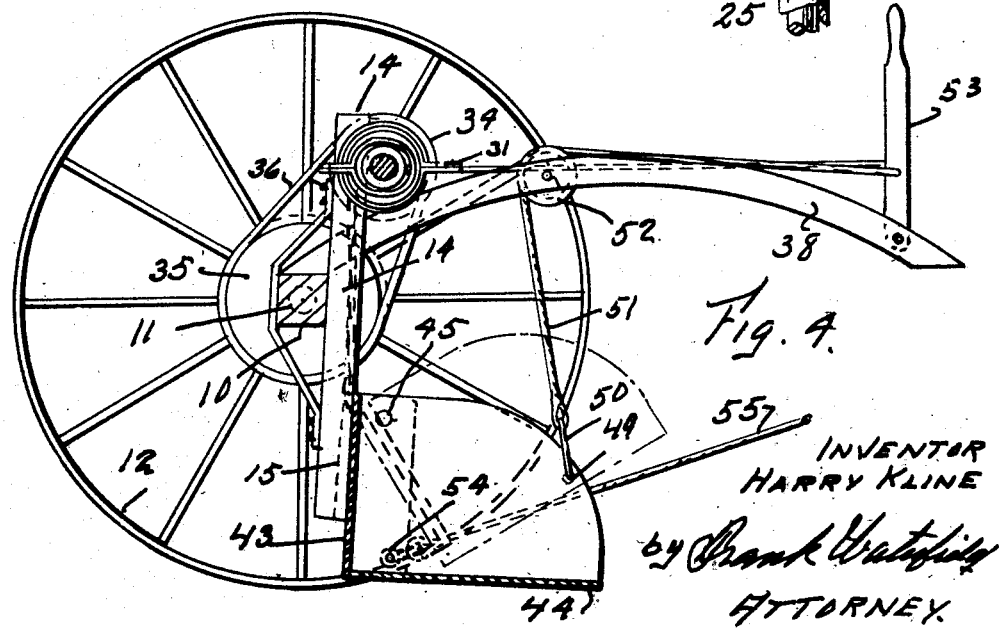

Patented June 16, 1925.

1,542,308

UNITED STATES PATENT OFFICE.

HARRY KLINE, OF KERMAN, CALIFORNIA.

WHEELED SCRAPER.

Application filed February 20, 1924. Serial No. 693,987.

*To all whom it may concern:*

Be it known that I, HARRY KLINE, a citizen of the United States, and resident of Kerman, in the county of Fresno, State of California, have invented certain new and useful Improvements in Wheeled Scrapers, of which the following is a specification.

My invention relates primarily to a wheeled scraper for use in levelling land, and has for its object the provision of a scraper of the above character so constructed and arranged as to be adjustable to penetrate any depth in the ground, and which may be elevated from the ground when loaded and the earth therein contained transferred to any desired place and either dumped in one spot or spread evenly over the ground.

Another object is to provide in a scraper of the above character means for easily and quickly dumping the same in any given quantity up to full capacity.

Other objects and advantages will appear hereinafter and, while I have shown and will describe the preferred form of my invention, I wish it understood that I do not limit myself to such preferred form, but that various changes and adaptations may be made therein without departing from the spirit of my invention.

In the drawings accompanying and forming a part hereof:

Fig. 3 is a top plan of the parts shown in Fig. 4, partly broken away. Fig. 4 is a section on the line 4—4 of Fig. 1 on an enlarged scale.

Fig. 5 is an enlarged top plan of the control members of my scraper.

Fig. 6 is a bottom end elevation of Fig. 5.

Figure 1:
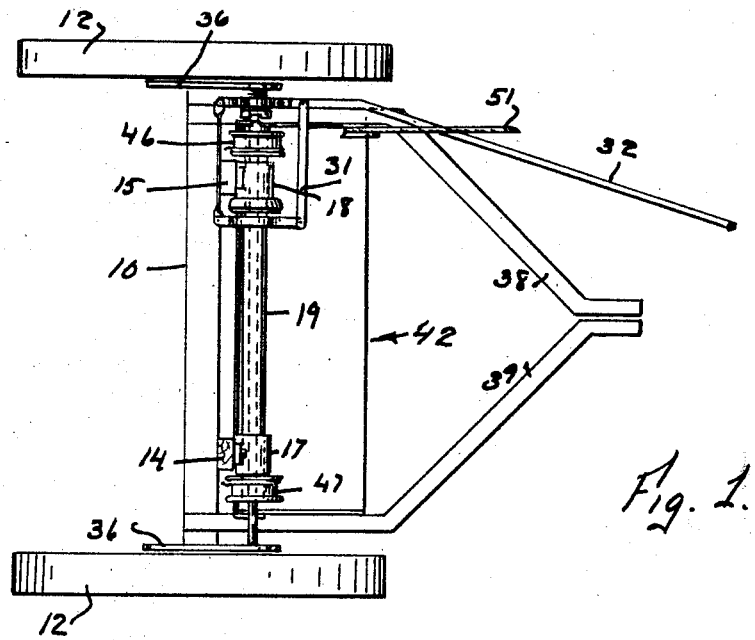
Fig. 1 is a top plan of a scraper constructed according to my invention.
Figure 2:
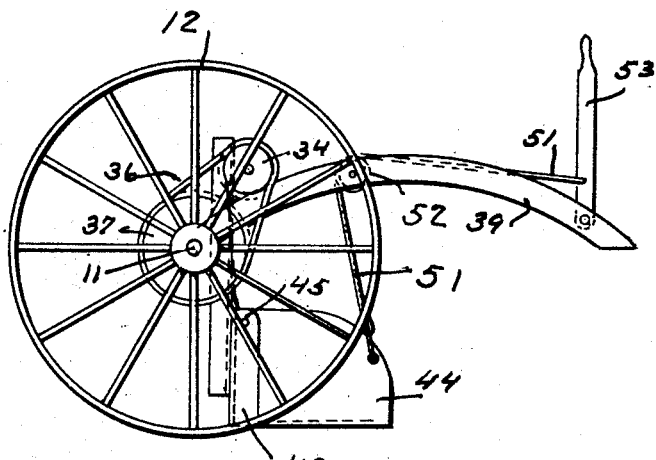
Fig. 2 is a side elevation of Fig. 1.

Referring to the drawings, my device comprises an axle 10, substantially rectangular, each end of which is reduced in size and rounded to provide journals 11 for the supporting wheels 12, one at each end thereof. Rigidly secured to axle 10, near each end thereof, are vertically extending guide members 13 and 14 in the front faces of which are provided dovetail grooves 15 and 16 which extend from the bottom to a short distance below the top. Rigidly mounted upon the upper ends of guide members 13 and 14, on the front faces thereof, are bearings 17 and 18 in which is revolubly mounted a hollow shaft 19 the ends of which project a short distance beyond said bearings. Rigidly mounted upon one of the projecting ends of shaft 19, at the outer end of bearing 18, is a winding drum 20 the outer face of which is provided with a clutch member 21. Formed upon the opposite end of bearing 18, preferably integral therewith, is an outwardly opening brake drum 22, and slidably but non-revolubly mounted upon shaft 18, for engagement with drum 22, is a braking member 23 adapted, when the same is brought into engagement with drum 22, to prevent the rotation of shaft 19. Extending outwardly from member 23, integral therewith and surrounding shaft 19, is a collar 24. Rigidly mounted upon shaft 19, at a short distance from the free end of member 24, is a collar 25, and coiled around shaft 19, between the ends of members 24 and 25, is a coil spring 26 which acts to normally hold member 23 in contact with drum 22. Extending outwardly from guide member 14, at the upper end thereof, is a bracket 27 the ends of which terminate in bearings 28 and 29. Pivotally mounted in bearing 28 is one end of a brake lever 30 which surrounds member 24 in operative engagement therewith, and its other end extends forwardly and is connected by a link 31 to an operating lever 32. One end of lever 32 is pivotally mounted in bearing 29 and the other end extends forwardly a suitable distance to be operated by the driver of the vehicle. Revolubly mounted within shaft 19 is a shaft 33 the ends of which project beyond shaft 19 and terminate at the sides of supporting wheels 12, and rigidly mounted upon these free ends are sprockets 34 and 35 which are connected by chains 36 to similar sprockets 37 connected to supporting wheels 12, it being understood that sprockets 37 are provided with the usual differential ratchet mechanism. Secured at one of their ends to each end of axle 10, adjacent to sprockets 37, are the arcuate adjusting members 38 and 39 which extend forwardly and inwardly and have their free ends adapted for engagement with the draw bar of a tractor or other pulling means. Slidably mounted within grooves 16 are guide blocks 40 and 41 which carry on their outer faces the scoop 42. Scoop 42 comprises two portions, a back portion 43 the ends of which are turned at right angles to extend forwardly, and a bottom portion 44 the ends of which are turned at right angles to extend upwardly, the ends of bottom portion 44 forming the sides of the scoop 42. Members 43 and 44 are pivoted together at 45, whereby when the free end of member 44 is elevated the same will assume the position shown in dotted lines in Fig. 4. Member 43 is connected at each side of its upper end, by cables 46 and 47, to the winding drums 20 on the ends of shaft 19, whereby when shaft 19 is rotated scoop 42 will be raised or lowered according to the rotation of said shaft. Rigidly mounted upon the end of shaft 33, at the side of sprocket 34, is a clutch member 48, controlled by lever 32, which is adapted to be brought into engagement with clutch member 21 of drum 20 to lock said shafts together. Provided in the edge of one side of member 44 is an aperture 49 in which is mounted a link 50, and connected to link 50 is a cable 51 the other end of which extends upwardly and passes over a grooved roller 52 mounted upon the side of member 39, and extends forwardly and is connected to a lever 53 pivotally mounted upon the side of member 38, which provides means for elevating the front end of member 44 when it is desired to dump the scoop 42. Secured to the outer sides of the projecting ends of member 43 are hooks 54 which are connected by cables 55 to any suitable propelling device, not shown.

In the operation of my device the parts will normally lie in the positions shown. Members 38 and 39 will be raised or lowered to determine the depth the ground is to be penetrated, it being understood that the device is being propelled along the ground at the time. When the scoop has been sufficiently filled, lever 32 will be moved inwardly by the operator, which will cause member 48 to engage clutch member 21, locking shafts 33 and 19 together, and by means of sprockets 34 and 35, chains 36 and sprockets 37, rotating said shafts, and at the same time, by means of link 31, moving member 33 from engagement with drum 22. As shaft 19 is rotated drums 20 will also rotate, and, by means of cables 46 and 47, scoop 42 will be elevated. When the scoop has been sufficiently elevated, lever 23 will be moved forwardly, disengaging members 48 and 21 and at the same time engaging members 23 and 22, preventing further rotation of shaft 19. When it is desired to dump the scoop, lever 53 will be moved forwardly and, by means of cable 51, will elevate the front end of member 44, thereby permitting the material within the scoop to escape from the rear end of bottom portion 44, between the same and back portion 43, it being understood that the amount of the elevation of the front end of member 44 will govern the speed with which the material is permitted to escape. When it is desired to use my device as a spreader, member 44 will be moved to its uppermost position and member 43 lowered the required distance above the ground, when the same will engage and spread the earth as desired. When it is desired to lower the scraper into contact with the ground, lever 32 will be moved inwardly a sufficient distance to release members 22 and 23 from contact, without bringing members 21 and 48 into contact, when the scoop will fall by gravity.

Having described my invention what I claim is:

1. A wheeled scraper comprising an axle; wheels supporting said axle; sprockets carried by said wheels; vertically extending guide members carried by said axle intermediate said wheels having guideways therein extending from the bottom to near the top; a scoop slidably mounted in said guideways; bearings rigidly mounted one at the upper end of each of said guide members; a hollow shaft revolubly mounted in said bearings to project beyond the outer ends thereof; a winding drum rigidly mounted upon said hollow shaft at each end thereof; cables connecting said drums and said scoop; a brake drum rigidly connected to the inner end of one of said bearings; a braking member slidably but non-revolubly mounted upon said hollow shaft adapted for engagement with said brake drum to retard rotation of said shaft; a shaft revolubly mounted within said hollow shaft and projecting beyond each end thereof; sprockets rigidly mounted upon the ends of said last shaft; chains connecting said sprockets and the sprockets of said supporting wheels, whereby when said wheels are rotated said shaft will be rotated therewith; a clutch member slidably but non-revolubly mounted at one end of said shaft; a clutch member projecting outwardly from said winding drum adapted for engagement by said first clutch member; an operating lever for said clutch members; an operating lever for said brake members; and means connecting said operating levers whereby the same are operated synchronously.

2. In a scraper a scoop therefor comprising a back member and a bottom member pivotally connected together, whereby elevating the front end of said bottom member will permit material carried by said scoop to escape between the rear edge of said bottom member and the lower end of said back member.

3. A scraper comprising an axle; supporting wheels for said axle; a pair of vertically extending guide members carried by said axle; a scoop slidably mounted in said guide members to slide vertically; a shaft carried by said guide members at the upper end thereof; connections from said shaft to said supporting wheels, whereby rotation of said supporting wheels will rotate said shaft; means carried by said shaft, upon the rotation thereof, to elevate said scoop; means mounted upon said shaft to lock said shaft against rotation; means to disconnect said shaft and supporting wheels, whereby the same are permitted to rotate independently; and means to dump said scoop.

4. A scraper comprising an axle; supporting wheels revolubly mounted upon each end of said axle; a pair of vertically extending guide members carried by said axle; a scoop slidably mounted in said guide members to slide vertically; a shaft carried by said guide members; operative connections from said shaft to said supporting wheels, whereby rotation of the supporting wheels will rotate said shaft; means carried by said shaft adapted upon the rotation thereof to elevate said scoop; means to connect and disconnect said shaft and supporting wheels; means between said shaft and one of said guide members adapted to retard the rotation of said shaft, and means to elevate the front end of said scoop.

5. A scraper comprising an axle; supporting wheel on each end of said axle revoluble thereon; a scoop carried by said axle capable of movement vertically; a shaft carried by said axle; operative connections from said shaft to said supporting wheels, whereby rotation of said wheels will rotate said shaft; means carried by said shaft adapted upon the rotation thereof to raise and lower said scoop; means to render said operative connections inoperative; means between said shaft and axle to lock said shaft against rotation to hold said scoop elevated; and means to dump said scoop.

In witness that I claim the foregoing I have hereunto set my hand this 26 day of September, 1923.

HARRY KLINE.